US012562481B2

(12) United States Patent
Narayan et al.

(10) Patent No.: US 12,562,481 B2

(45) Date of Patent: Feb. 24, 2026

(54) ANTENNA APPARATUS AND BASE STATION

(71) Applicant: Huawei Technologies Co., Ltd., Shenzhen (CN)

(72) Inventors: Choubey Prem Narayan, Shenzhen (CN); Xue Bai, Dongguan (CN); Guoqing Xie, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 643 days.

(21) Appl. No.: 17/843,246

(22) Filed: Jun. 17, 2022

(65) Prior Publication Data

US 2022/0320739 A1 Oct. 6, 2022

Related U.S. Application Data

(63) Continuation of application No. PCT/CN2019/126723, filed on Dec. 19, 2019.

(51) Int. Cl.

*H01Q 21/26* (2006.01)
*H01Q 1/24* (2006.01)
(Continued)

(52) U.S. Cl.

CPC ............... *H01Q 5/48* (2015.01); *H01Q 1/246* (2013.01); *H01Q 1/521* (2013.01); *H01Q 9/16* (2013.01); *H01Q 9/285* (2013.01); *H01Q 21/26* (2013.01)

(58) Field of Classification Search

CPC ............ H01Q 1/246; H01Q 5/48; H01Q 9/16; H01Q 9/285; H01Q 21/26; H01Q 1/52
See application file for complete search history.

(56) References Cited

U.S. PATENT DOCUMENTS 6,559,809 B1 * 5/2003 Mohammadian ........ H01Q 9/16 343/702
9,698,493 B2 * 7/2017 Wang ..................... H01Q 1/247
(Continued)

FOREIGN PATENT DOCUMENTS

CN 102299398 A 12/2011
CN 202103156 U 1/2012
(Continued)

OTHER PUBLICATIONS

Sun, Hai-Han et al., "Suppression of Cross-Band Scattering in Multiband Antenna Arrays," IEEE Transactions on Antennas and Propagation, vol. 67, No. 4, Apr. 2019, 11 pages.

*Primary Examiner* — Ab Salam Alkassim, Jr.
(74) *Attorney, Agent, or Firm* — Slater Matsil, LLP

(57) ABSTRACT

Provided are antenna apparatus and a base station, where the antenna apparatus includes a first radiator configured to radiate a low-frequency signal and a second radiator configured to radiate a high-frequency signal, the first radiator comprising at least one first stub and at least one second stub; one end of the first stub is connected to a first connecting point on the first radiator, the other end of the first stub is a free end; one end of the second stub is connected to a second connecting point on the first radiator, the other end of the second stub is a free end; and a sum of a length of the first stub, a length of the second stub, and a length of the first radiator between the first connecting point and the second connecting point is determined according to a wavelength corresponding to a predefined high frequency.

20 Claims, 9 Drawing Sheets

(51) Int. Cl.

| | |
|---|---|
| ***H01Q 1/52*** | (2006.01) |
| ***H01Q 5/48*** | (2015.01) |
| ***H01Q 9/16*** | (2006.01) |
| ***H01Q 9/28*** | (2006.01) |

(56) References Cited

U.S. PATENT DOCUMENTS

| | | | | |
|---|---|---|---|---|
| 12,062,855 | B2 * | 8/2024 | Li | H01Q 21/062 |
| 2002/0118075 | A1 * | 8/2002 | Ohwada | H01Q 21/30<br>333/32 |
| 2006/0208954 | A1 * | 9/2006 | Han | H01Q 13/08<br>343/700 MS |
| 2008/0231526 | A1 * | 9/2008 | Sato | H01Q 7/00<br>343/722 |
| 2013/0049900 | A1 * | 2/2013 | Chung | H01Q 1/38<br>333/204 |
| 2016/0111796 | A1 * | 4/2016 | Kim | H01Q 21/0018<br>343/833 |
| 2017/0047642 | A1 * | 2/2017 | Li | H01Q 1/48 |
| 2017/0062940 | A1 * | 3/2017 | Cao | H01Q 1/246 |
| 2019/0157762 | A1 * | 5/2019 | Shibata | H01Q 9/0407 |
| 2019/0319352 | A1 * | 10/2019 | Gonzalez | H01Q 1/521 |
| 2020/0127389 | A1 * | 4/2020 | Li | H01Q 25/001 |
| 2021/0005967 | A1 * | 1/2021 | Sudo | H04B 1/0458 |
| 2021/0296786 | A1 * | 9/2021 | Xu | H01Q 1/521 |
| 2021/0305721 | A1 * | 9/2021 | Li | H01Q 21/26 |
| 2021/0359407 | A1 * | 11/2021 | Xiao | H01Q 5/48 |
| 2022/0006191 | A1 * | 1/2022 | Shibata | H01Q 5/307 |
| 2022/0123453 | A1 * | 4/2022 | Ramzan | H01P 1/2135 |
| 2022/0200159 | A1 * | 6/2022 | Abdelrahman | H01Q 9/285 |
| 2023/0046767 | A1 * | 2/2023 | Shu | H01Q 5/307 |
| 2023/0137645 | A1 * | 5/2023 | Shen | H01Q 21/24 |
| 2023/0223709 | A1 * | 7/2023 | Guntupalli | H01Q 25/001<br>343/702 |
| 2023/0275984 | A1 * | 8/2023 | Lan | H01Q 1/273<br>455/575.1 |
| 2023/0361475 | A1 * | 11/2023 | Sun | H01Q 5/48 |
| 2024/0283164 | A1 * | 8/2024 | Ai | H01Q 9/44 |
| 2025/0125540 | A1 * | 4/2025 | Ai | H01Q 15/006 |
| 2025/0158287 | A1 * | 5/2025 | Qin | H01Q 9/42 |
| 2025/0183558 | A1 * | 6/2025 | Sundararajan | H01Q 5/42 |
| 2025/0239779 | A1 * | 7/2025 | Chen | H01Q 5/50 |

FOREIGN PATENT DOCUMENTS

| | | | | | |
|---|---|---|---|---|---|
| CN | 103647140 | A | | 3/2014 | |
| CN | 108598677 | A | | 9/2018 | |
| CN | 209516000 | U | | 10/2019 | |
| CN | 111313155 | A | | 6/2020 | |
| EP | 3886255 | A1 | | 9/2021 | |
| EP | 3886255 | A4 | | 1/2022 | |
| KR | 101709318 | B1 | * | 2/2017 | |
| WO | 2014100938 | A1 | | 7/2014 | |
| WO | WO-2023155973 | A1 | * | 8/2023 | H01Q 1/246 |
| WO | WO-2024030775 | A1 | * | 2/2024 | |
| WO | WO-2024076946 | A1 | * | 4/2024 | H01Q 1/246 |

* cited by examiner

ANTENNA APPARATUS AND BASE STATION

CROSS-REFERENCE TO RELATED APPLICATIONS

This application is a continuation of International Application No. PCT/CN2019/126723, filed on Dec. 19, 2019, the disclosure of which is hereby incorporated by reference in its entirety.

TECHNICAL FIELD

The present application relates to the technical field of communication technologies, and in particular, to antenna apparatus and a base station.

BACKGROUND

An antenna is a conversion member which may transfer a guided wave on a transmission line into an electromagnetic wave in a free space, or perform the transferring reversely.

Nowadays, with the advancement of wireless communication networks, the base-station antenna architecture is becoming more and more sophisticated. The allocation of new bands and the race for having one solution for all, i.e. the one antenna to serve over all bands and all network generations, makes the base-station antenna's reflector densely occupied by the arrays of "various bands radiators".

Although, from the network point of view, having one antenna for all solution (a multi-band antenna) is exciting, from antenna designer point of view there have various challenges such as, the low-band radiators, which mostly shadow the higher bands radiators (due to their large size), resonate in the higher-band operating frequencies and deteriorate the radiation patterns of antenna's higher-band.

Therefore, more and more attention is drawn to the above performance deterioration problem in the multi-band antenna environment.

This background information is provided to reveal information believed by the applicant to be of possible relevance to the present application. No admission is necessarily intended, nor should be construed, that any of the preceding information constitutes prior art against the present application.

SUMMARY

In view of the above, in order to overcome the above problem, the present application provides antenna apparatus and a base station.

The foregoing and other objects are achieved by the subject matter of the independent claims. Further implementation forms are apparent from the dependent claims, the description and the figures.

A first aspect the present application relates to antenna apparatus, including a first radiator configured to radiate a low-frequency signal and a second radiator configured to radiate a high-frequency signal, the first radiator including at least one first stub and at least one second stub; one end of the first stub is connected to a first connecting point on the first radiator, the other end of the first stub is a free end; one end of the second stub is connected to a second connecting point on the first radiator, the other end of the second stub is a free end; and a sum of a length of the first stub, a length of the second stub, and a length of the first radiator between the first connecting point and the second connecting point is determined according to a wavelength corresponding to a predefined high frequency.

According to the antenna apparatus of the present application, the induced current is re-directed over the high-band on the low-band radiator by introducing the stubs across a separating point (also referred to as a vertex) of the dipole ring. These stubs alter the current path then the resonance mode of the induced current over the low-band radiator in the high-band. Thus, the use of one or more stubs, over vertex, is advantageous to reduce the scattering of low-band radiators in high-band.

In an implementation manner, each of the two monopole arms includes two pairs of first stubs and second stubs, each pair of the first stubs and the second stubs are arranged on both sides of a separating point of the monopole arm. In an implementation manner, each of the two monopole arms includes three pairs of first stubs and second stubs, each pair of the first stubs and the second stubs are arranged on both sides of a separating point of the monopole arm.

With more stubs, the scattering free bandwidth may be further widened.

In an implementation manner, a total number of the first stubs and the second stubs are determined by a width of a predefined operating band corresponding to the predefined high frequency.

In this way, the performance may be adaptively adjusted according to actual needs.

A second aspect of the present application relates to a base station, including antenna apparatus of the first aspect or any implementation manner thereof and a reflector, both of the first radiator and the second radiator are fed through the reflector.

Here in the present application, the applied stubs are creating new current path/paths therefore altering the resonance mode of the induced current on low band radiator arms, over high-band.

BRIEF DESCRIPTION OF THE DRAWINGS

The accompanying drawings are used to provide a further understanding of the present application, constitute a part of the specification, and are used to explain the present application together with the following specific embodiments, but should not be construed as limiting the present application. In the drawings.

DETAILED DESCRIPTION OF ILLUSTRATIVE EMBODIMENTS

Figure 1:
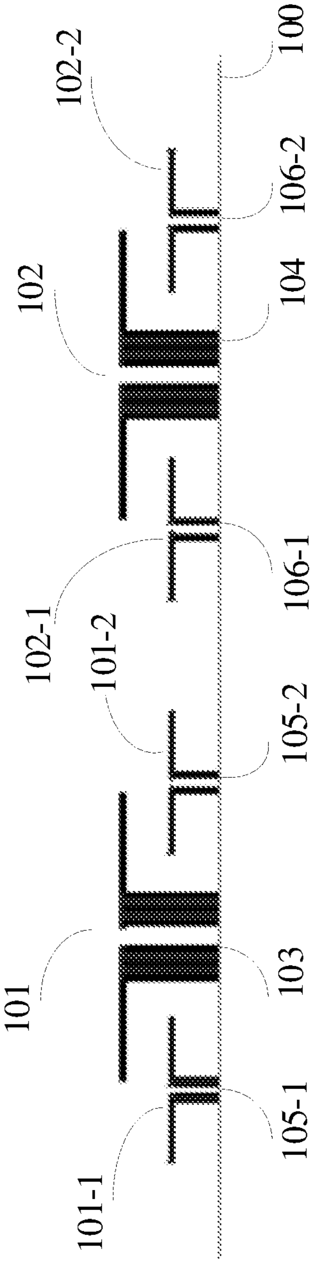
FIG. 1 illustrates a schematic structural view of a dual-polarized dual-band antenna apparatus in prior art.

In the following description, reference is made to the accompanying figures, which form part of the application, and which show, by way of illustration, specific aspects of embodiments of the present application or specific aspects in which embodiments of the present application may be used. It is understood that embodiments of the present application may be used in other aspects and comprise structural or logical changes not depicted in the figures. The following detailed description, therefore, is not to be taken in a limiting sense, and the scope of the present application is defined by the appended claims.

Technical solutions of the present application may be applied in various communication systems, e.g., a global system of mobile communication (GSM), a code division multiple access (CDMA) system, a wideband code division multiple access wireless system, a general packet radio service system, a long term evolution (LTE) system, etc.

A base station, may be a base station (Base Transceiver Station, BTS) in a GSM system, a GPRS system, or a CDMA system, or may also be a base station (NodeB) in a CDMA2000 system or a WCDMA system, or may also be an Evolved base station (Evolved NodeB, eNB) in an LTE system, or may also be a base station (Access Service Network Base Station, ASN BS) in an access service network of a WiMAX network or other network elements.

A terminal device, which may also be referred to as a user device, a terminal station or user equipment, may be any one of the following devices: a smartphone, a mobile phone, a cellular phone, a cordless phone, a session initiation protocol (SIP) phone, a wireless local loop (WLL) station, a personal digital assistant (PDA), a handheld device capable of wireless communication, an on-board equipment, a wearable device, a computing device or other processing devices connecting to a wireless modem.

The terms “high-frequency” and “low-frequency” referred to throughout the text, unless otherwise defined, are simply used to describe a relatively high frequency and a relatively low frequency respectively, rather than limiting specific values of the frequencies. Similarly, the terms “high-band” (or “higher-band”) and “low-band” (or “lower-band”), unless otherwise defined, are also used to describe a higher frequency band and a lower frequency band. Besides, a “low-band radiator” refers to a radiator from such a lower frequency band and a high band radiator refers to a radiator from higher frequency band.

As described in the background, although one antenna for multiband is exciting, but there may be some challenges such as the resonation of the low-band radiator in the higher-band operating frequencies. The objective of the present application is to address and then resolve the resonance problem that arises in arms of the lower-band radiators, when the higher-band radiators are places its underneath.

As known in the art, there are various kinds of base station antennas, for example, single-polarized antennas, dual-polarized antennas and etc. In order to facilitate the description, in the following, examples are taken where the antenna is of a dual-polarized type, however, it should be noted that the technical solutions of the present application also apply to other types of antennas.

Figure 2:
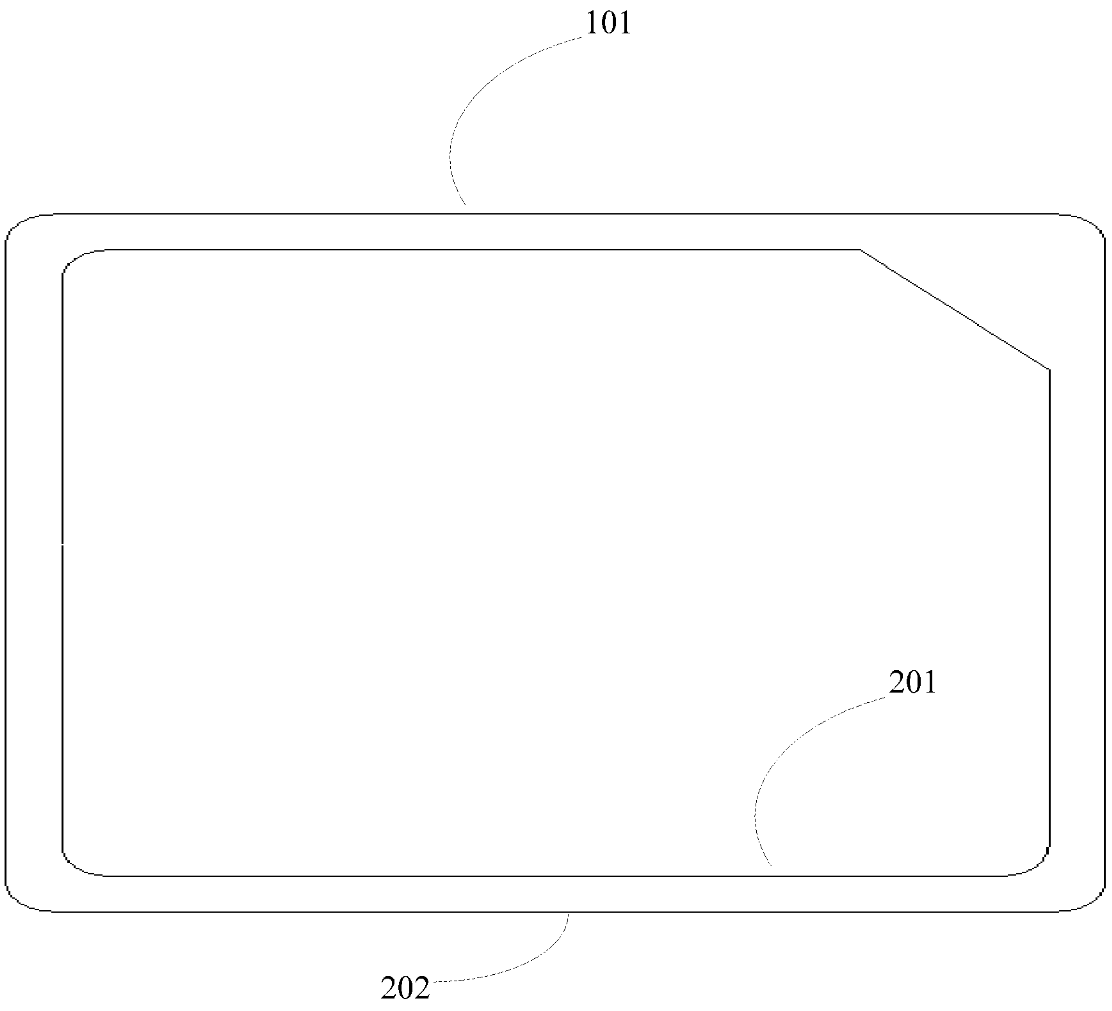
FIG. 2 illustrates a top view of one monopole arm of the low-band radiator shown in FIG. 1.

The structure of an existing antenna apparatus will be illustrated herein with reference to FIG. 1 and FIG. 2. FIG. 1 illustrates a schematic structural view of a dual-polarized dual-band antenna apparatus in prior art, and FIG. 2 illustrates a top view of one monopole arm of the low-band radiator shown in FIG. 1. FIG. 1 illustrates the arrangement (in side view) of low-band and high-band radiators on the same reflector of a dual-polarized dual-band base station antenna. Here the high-band radiator lies below the low-band radiator. However, the arrangement shown in FIG. 1 is just for illustrative purpose, other arrangement may also be possible.

The low-band radiator is configured to radiate a low-frequency signal, and includes −45 Degree (Deg) and +45 Deg polarization dipole arms. Similarly, the high-band radiator is configured to radiate a high-frequency signal and also includes −45 Deg and +45 Deg polarization dipole arms. The polarization of an antenna refers to the direction of the electric field intensity formed when the antenna radiates: when the direction of the electric field intensity is parallel to the ground, the polarization direction of the antenna is a horizontal polarization direction; when the direction of the electric field intensity is perpendicular to the ground, the polarization direction of the antenna is a vertical polarization direction. Here the +45 Deg polarization means that the direction of the electric field intensity is of a +45 Deg angel relative to the ground, and the −45 Deg polarization means that the direction of the electric field intensity is of a −45 Deg angel relative to the ground.

For the sake of brevity, here only two radiators including a low-band radiator and a high-band radiator are shown in the figure, however, more radiators may be placed on the reflector 100 according to actual needs, the number of the radiators is not limited thereto. In an interspersed design, typically the low-band radiators are located on an equal spaced grid appropriate to the frequency and then the low-band radiators are placed over intervals that are n integral number times of intervals at which the high-band radiators are placed. In most cases the interval between two low-band radiators has been occupied by two high-band radiators, with corresponding spacing, depending on the antenna architecture.

As illustrated in FIG. 1, a common reflector 100 for both low-band and high-band radiators is the shared ground. In FIG. 1, one dipole of the low-band radiator contains two monopole arms 101, 102, they form the dipole for one polarization; the other dipole of the low-band radiator is not visible, but symmetric to the visible one; the low-band radiator is fed through baluns 103 and 104. For each of the monopole arms of the low-band radiator, for example, two monopole arms 101-1, 101-2 of the high-band radiator are arranged near the monopole arm 101 of the low-band radiator and are fed through baluns 105-1 and 105-2 respectively; similarly, two monopole arms 102-1, 102-2 of the high-band radiator are arranged near the monopole arm 102 of the low-band radiator and are fed through baluns 106-1 and 106-2 respectively; the other polarization arm of the high-band radiator is not visible but symmetric to the visible one.

FIG. 2 shows one monopole arm 101 of the low-band radiator shown in FIG. 1. The monopole arm 101 is shown as a metallic ring of a rectangle shape and includes an inner periphery 201 and an outer periphery 202. In actual applications, the monopole arm may be of other shapes, for example, square, circular and etc., which is not limited herein. In the following description, examples are taken where the monopole arm is of a rectangle shape, but it should be understood that the same principle applies where the monopole arm is of other shapes. These versions of metallic rings, which in pair form the dipole of a lower-band radiator, have good radiation characteristics over their corresponding operating band. However, these rings unwontedly resonate and then scatter the radiation of higher-band radiator (which is lying underneath it in the multiband antenna environment), in result of that, the radiation pattern of high-band radiator deteriorate, significantly.

As described above, the low-band radiator shown in multiband antenna environment would deteriorate radiation patterns of antenna's higher-band due to its resonations in the higher-band operating frequencies. The main challenge in the design of such multiband antennas is to minimize the effect of scattering of signal at higher-band due to the radiators for other but lower-band. The scattering, referred here, affects the beam width (BW), the beam shape, the cross-polarization level, front-to-back ratio (FBR) and all these above varies randomly, both in azimuth and elevation cuts. Where there could have few options to compensate these scattering effects in narrow-band antennas, it is highly challenging to compensate those over the wide-band, by merely shifting the resonance point through readjustment of the respective positions of low-band and high-band dipoles or by other conventional mean.

In order to solve that problem, the present application provides arrangements of low-band radiators of a multiband dual-polarized base station antenna and the stubs on dipole arms of the low-band radiator, for making it radiation free in the operating band of the high-band radiator, which will be described hereinafter, by way of examples only, with reference to the accompanying drawings.

The embodiments of the present application relate generally to low-band radiators of dual-polarized multiband base station antennas with interspersed radiators intended for cellular communication use and in some implementations, to antennas intended for a low-band frequency band of 1695-2690 MHz or part thereof and a high frequency band 3300-3800 MHz or part thereof.

Hereinafter, the dipole arms of low-band dual-polarized radiators from a multiband base station antenna are disclosed. In the following description, numerous specific details, including operating band and bandwidths, dipole arm shapes and materials, substrate materials are set forth. However, from the present application, it will be apparent to those skilled in the arm that modifications and/or substitution may be made without departing from the scope and sprit of the application. In other circumstances, specific details may be omitted so as not to obscure the application.

Figure 3:
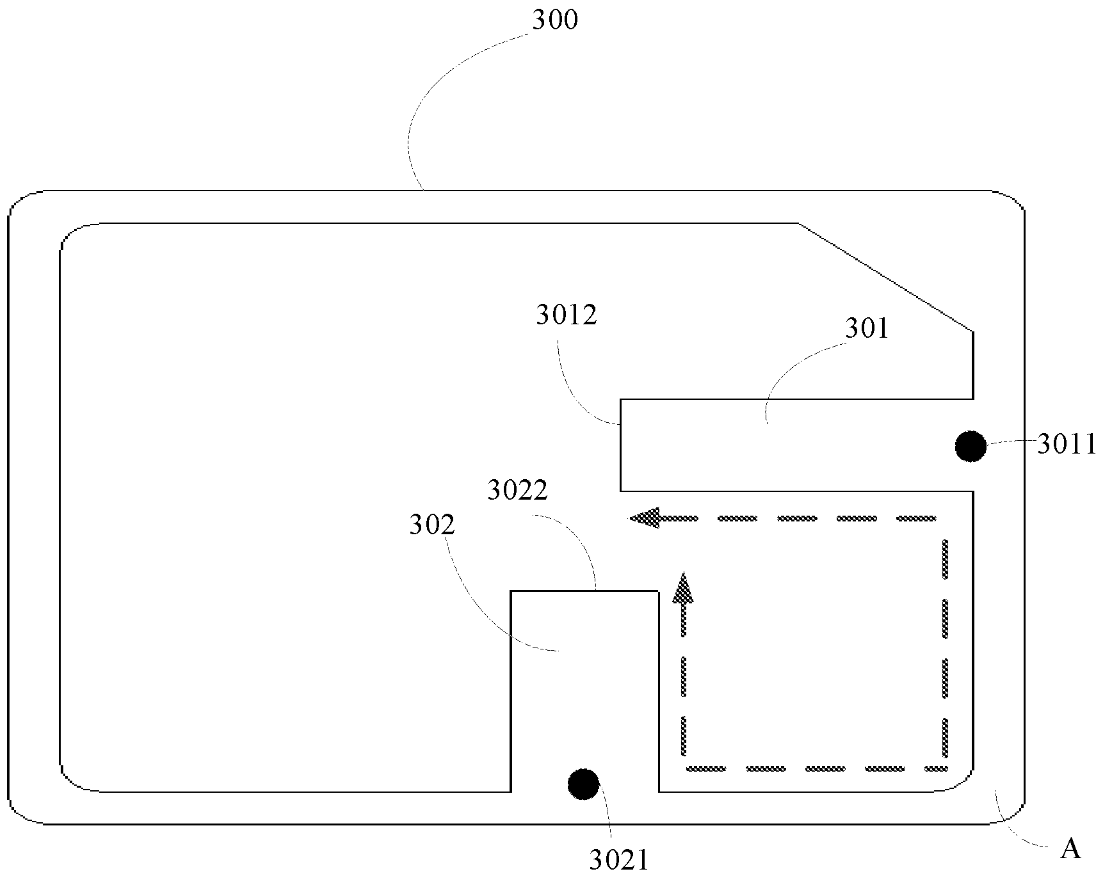
FIG. 3 illustrates a schematic top view of a monopole arm of a low-band radiator for dual-polarized dual-band antenna apparatus according to an embodiment of the present application.

FIG. 3 illustrates a schematic top view of a monopole arm of a low-band radiator for dual-polarized dual-band antenna apparatus according to an embodiment of the present application, which simply illustrates one monopole arm of the low-band radiator provided by the present application. With respect to the dual-polarized antenna apparatus, the first radiator 300 includes two dipole arms, where each of the dipole arms includes two monopole arms. FIG. 3 simply illustrates the monopole arm with one pair (sets of two) of stubs applied over the vertex of the rectangular metallic ring, taken from FIG. 2, in its original form. These stubs in pair with enclosed vertex (of the monopole arm), form a new current path for an induced current, which happen due to the excitation on high-band radiator. Details will be elaborated hereinafter with reference to the figure.

As shown in FIG. 3, the antenna apparatus includes a first radiator 300 and a second radiator (not shown), the first radiator 300 may include at least one first stub and at least one second stub, with reference to FIG. 3, the first radiator 300 includes one first stub 301 and one second stub 302. The second radiator may be arranged in the same way as the high-band radiator shown in FIG. 1, which is not described in detail for the sake of brevity. Besides, the first radiator may also be referred to as a low-band radiator and the second radiator may also be referred to as a high-band radiator.

The first radiator 300 is configured to radiate a low-frequency signal and the second radiator is configured to radiate a high-frequency signal. Description is made here with reference to dual-band antenna apparatus, in actual applications, more radiators may be arranged to realize antenna apparatus operating in more bands. In some implementations, the low-frequency or the low-band refers to a lower frequency band such as 1695-2690 MHz, and the high-frequency or the high-band refers to a higher frequency band, such as 3300-3800 MHz. In some implementations, since in the multiband antenna environment the similar problem happens on the 1695-2690 MHz band radiator (the high-band radiator) due to the presence of the 690-960 MHz band radiator (the low-band radiator), in this context the 1695-2690 MHz band could be the high-band and the 690-960 MHz could be the low-band. Surely, the frequencies may be of other values, which are not limited herein. Characteristics of particular interest are the beam width (BW), the shape of beam, the directivity and the S-parameters. Here the spirit of the problem is the same therefore the disclosed application could be applied to resolve the coupling/scattering problem in this scenario of the multiband antenna, partially or completely.

As shown in the figure, one end of the first stub 301 is connected to a first connecting point 3011 on the first radiator 300, the other end 3012 of the first stub 301 is a free end, one end of the second stub 302 is connected to a second connecting point 3021 on the first radiator 300, the other end 3022 of the second stub 302 is a free end. The solid black circles representing the connecting points are simply for illustrative purpose.

Further, the first stub 301 and the second stub 302 are arranged at specific locations so that a new current path (the dashed line as shown in FIG. 3) will be formed between the free end 3012 of the first stub 301 and the free end 3022 of the second stub 302, this may be realized by limiting the distance therebetween.

As described in the previous paragraphs, the objective of the present application is to provide a low-band radiator (the first radiator) which is radiation free in the high-band, which means that the radiation power of the low-band radiator is relatively low in the targeted high-band. This may be realized by arranging stubs at specific positions so that the length of the current path, i.e., the distance between two open ends of the two stubs, is set at a predefined value. Specifically, a sum of a length of the first stub 301, a length of the second stub 302, and a length of the first radiator 300 between the first connecting point 3011 and the second connecting point 3021 is determined according to a wavelength corresponding to a predefined high frequency. The length of the stub, as well as the length of the radiator throughout the description, refers to the physical length thereof.

As is known to those skilled in the art, the product of the frequency and the wavelength equals to the speed of the light (It should be noted that the permittivity (c) of the substrate is also involved if the dipole is made by PCB), said wavelength is referred to as the wavelength corresponding to said frequency. Therefore, once the frequency is determined, the wavelength corresponding to this frequency is also determined.

In an implementation, the predefined high frequency may be set according to actual needs, such as an operating frequency of the second radiator (high-band radiator) chosen according to empirical tests. For example, the predefined high frequency may be a central operating frequency of the second radiator (high-band radiator). As described above, the wavelength corresponding to the predefined high frequency can be easily obtained by dividing the speed of the light with the predefined high frequency. Then the sum of the length of the first stub 301, the length of the second stub 302, and the length of the first radiator 300 between the first connecting point 3011 and the second connecting point 3021 can be determined according to the obtained wavelength. For example, the sum may be set as ½ of the obtained wavelength, or ¾ of the obtained wavelength, depending on actual needs. It should be noted that there is no specific requirements on each of the three lengths mentioned above, as long as their sum meets the limitation. The first stub 301 and the second stub 302 may be first placed at specific positions, and the length of the first radiator 300 between the first connecting point 3011 and the second connecting point 3021 is determined as L, then the sum of the length of the first stub 301 and the length of the second stub 302 is determined as, for example, ½ of the obtained wavelength minus L, consequently, the lengths of the two stubs can be chosen as long as their sum equals to the above determined sum.

Generally, the physical length of the stub may be represented by its electrical length which refers to a multiple of the wavelength. That is, the electrical length of the first stub 301 may be a ratio between the physical length of the first stub 301 and the obtained wavelength, the electrical length of the second stub 302 may be a ratio between the physical length of the second stub 302 and the obtained wavelength, and the electrical length of the first radiator 300 between the first connecting point 3011 and the second connecting point 3021 may be a ratio between the physical length thereof and the obtained wavelength. As an embodiment, the electrical length of the first radiator 300 between the first connecting point 3011 and the second connecting point 3021 may be chosen as ¼, both of the electrical lengths of the first stub 301 and the second stub 302 may be set as ⅛. While it is not necessary for the two stubs to have same dimensions, other options may be made of course, as long as the sum of the three electrical lengths is ½.

In an implementation, the first stub 301 and the second stub 302 are arranged on both sides of a separating point A of the monopole arm.

In an implementation, the first stub 301 and the second stub 302 are arranged in a periphery of the first radiator 300, as an embodiment, in an inner periphery of the first radiator 300.

In an implementation, the second radiator may be made of a printed circuit board (PCB) based dual-polarized patch.

In an implementation, the monopole arm of the first radiator 300 may be a metallic ring of a rectangular shape (as shown in FIG. 3), or in other shapes, such as a square shape or a circular shape. The shape of the monopole arm in FIG. 3 is just for illustrative purpose, which is not limited thereto.

Besides, the length of the first radiator 300 between the first connecting point 3011 and the second connecting point 3021 refers to the shorter length therebetween, in the case shown in FIG. 3, where the monopole arm is of a rectangle shape, said length refers to the length of the first radiator 300 passing by the separating point A.

It should be noted that although descriptions are made with reference to dual-polarized dual-band antenna apparatus hereinafter, but the same principle applies in other antenna architecture as well, for example, in single-polarized dual-band antenna apparatus. In the case of the single-polarized dual-band antenna apparatus, as an embodiment, the second radiator may be made of a PCB based single-polarized patch.

The radiators of the present application could be made of PCB or die-casting, where all elements/components are the part of one piece. Therefore, the total antenna design could be easy in manufacturing and lower in the manufacturing cost.

The embodiments of the present application re-direct the induced current over the high-band on the low-band radiator by introducing the first and second stubs across a separating point (also referred to as a vertex) of the dipole ring. These stubs alter the current path then the resonance mode of the induced current over the low-band radiator in the high-band. Thus, the use of one or more stubs, over vertex, is advantageous to reduce the scattering of low-band radiators in high-band. Here in the present application, the applied stubs are creating new current path/paths therefore altering the resonance mode of the induced current on low band radiator arms, over high-band.

For altering the embodiments, the stub position, the number of stubs in the ring, the shape and type of the ring, the thickness and the fatness of the ring arm could be changed or modified by those skilled in the art, without departing from the scope of the present application.

In the foregoing embodiment, examples were shown with one pair of stubs, that is, one first stub and one second stub. In actual applications, a total number of the first stubs and the second stubs may be determined by a width of a predefined operating band corresponding to the predefined high frequency. In an implementation, the wider the operating band corresponding to the predefined high frequency is, the more stubs are used. In the following part, examples will be elaborated where more than two stubs are adopted.

Figure 4A:
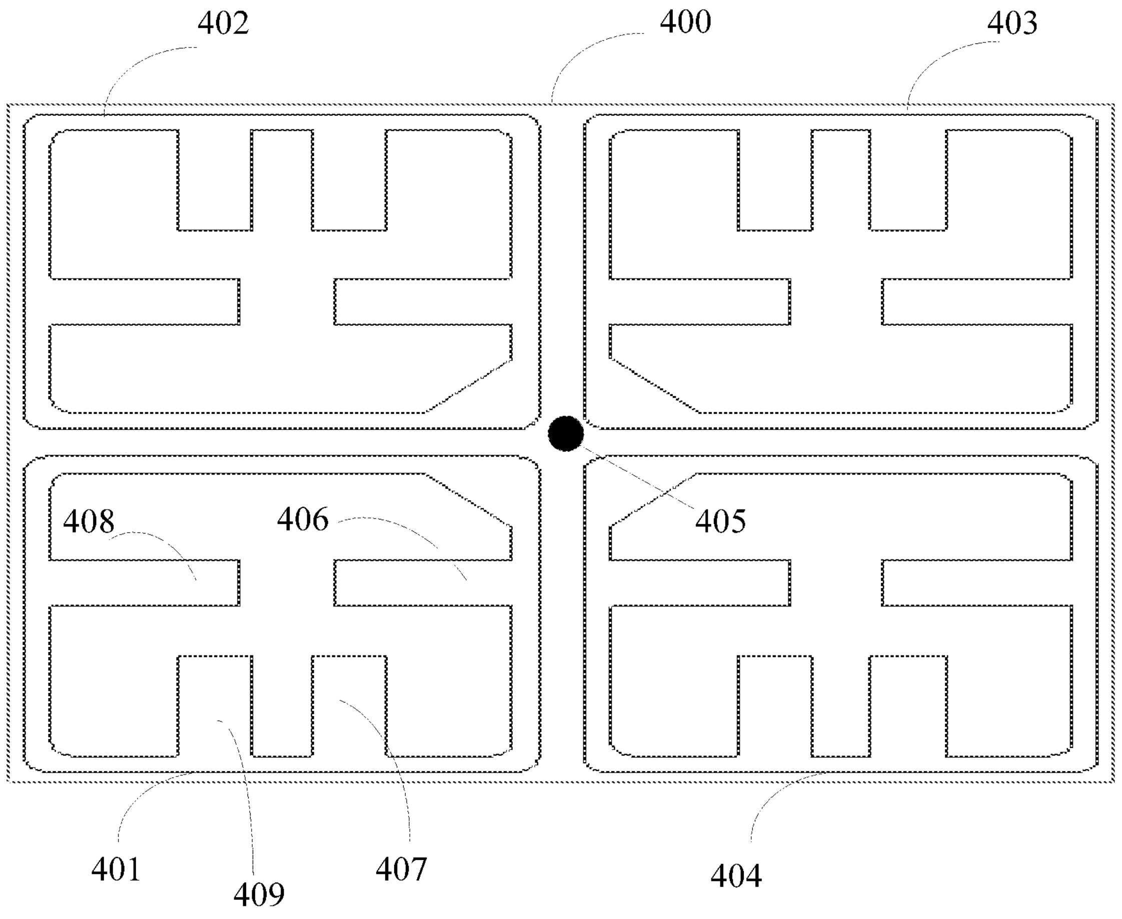
FIG. 4*a* illustrates a schematic top view of dipole arms of a low-band radiator for dual-polarized dual-band antenna apparatus according to an embodiment of the present application.
Figure 4B:
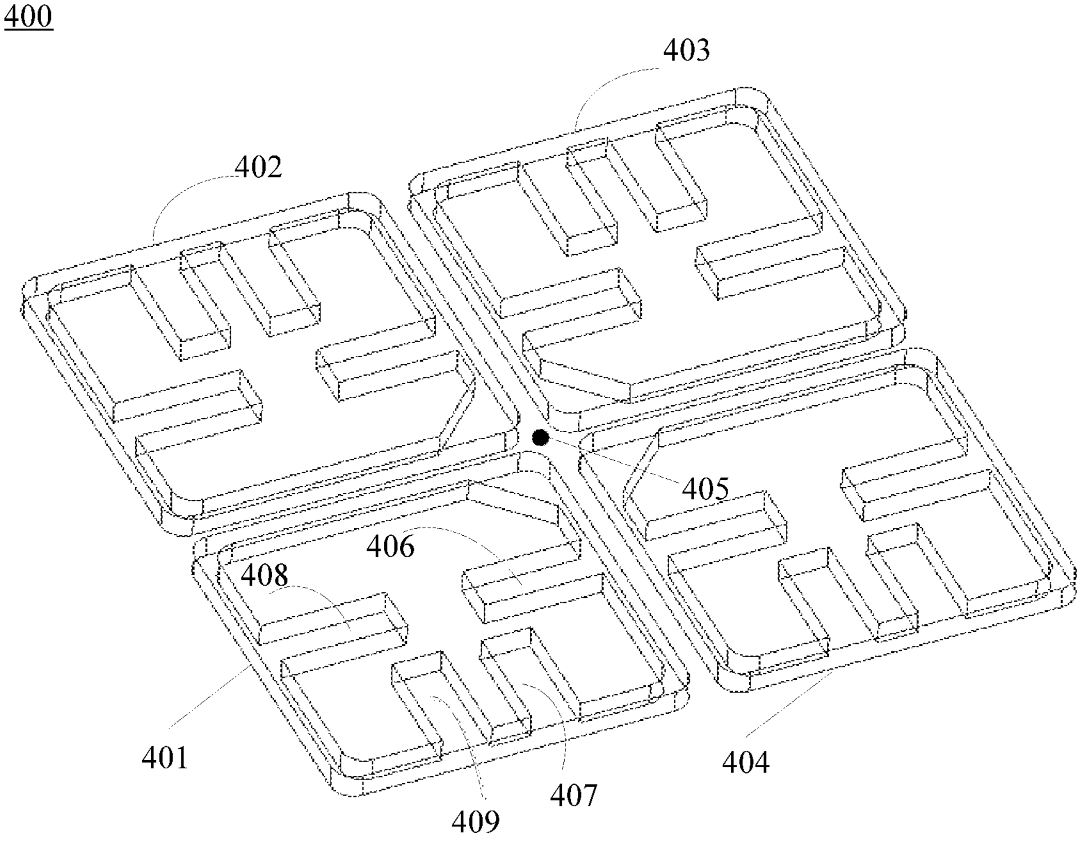
FIG. 4*b* illustrates a stereogram of dipole arms of the low-band radiator for dual-polarized dual-band antenna apparatus according to an embodiment of the present application.
Figure 4C:
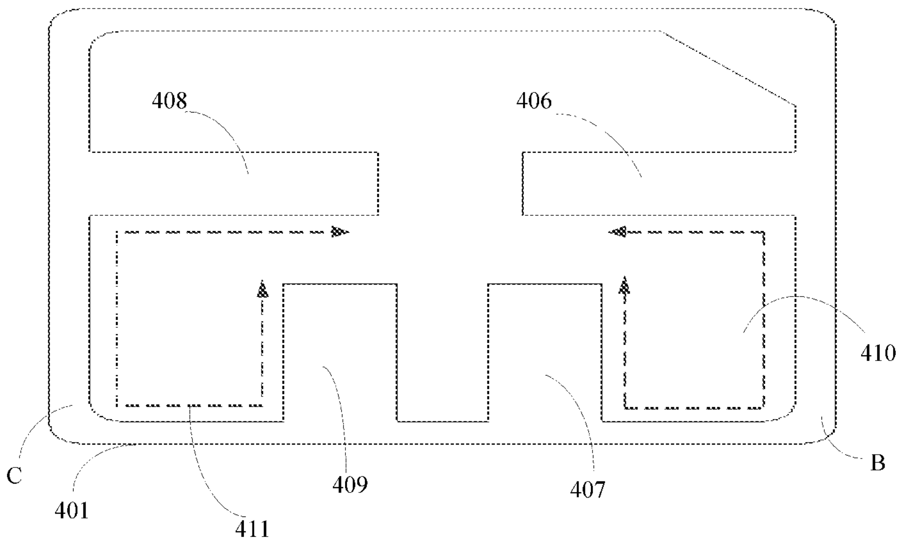
FIG. 4*c* illustrates a schematic top view of a monopole arm of the dipole arm shown in FIG. 4*a*.

FIG. 4*a* illustrates a schematic top view of dipole arms of a low-band radiator for dual-polarized dual-band antenna apparatus according to an embodiment of the present application. FIG. 4*b* illustrates a stereogram of dipole arms of a low-band radiator for dual-polarized dual-band antenna apparatus according to an embodiment of the present application. The difference between FIG. 4*a* and FIG. 4*b* lies in that the former one, i.e., FIG. 4*a* is made by PCB, and the latter one, i.e., FIG. 4*b* is made by die-casting or stamping. FIG. 4*c* illustrates a schematic top view of a monopole arm of the dipole arm shown in FIG. 4*a*. FIG. 4*c* illustrates the monopole ring, taken from FIG. 2 and FIG. 3 in its original form, with one more pair of stubs over its another vertex. These new set of stubs along with enclosed vertex form another current loop for the induced current, from high-band radiator lying underneath the low-band radiator, in multi-band antenna environment.

Referring to FIG. 4*a*-FIG. 4*c*, each monopole arm of the dual-polarized radiator (the low-band radiator) has two pairs of stubs, each pair of stubs applied over the vertex of the monopole arm.

Specifically, the first radiator 400 (the low-band radiator) contains fours rectangular metallic rings 401-404, with side length of approximately quarter wavelength, form the +45 Deg and −45 Deg polarization dipole arms. Each metallic ring is a monopole arm of the first radiator 400 and includes two pairs of first stubs and second stubs, each pair of the first stubs and the second stubs are arranged on both sides of a separating point of the monopole arm.

In an implementation, the dipole arms are configured in cross-dipole arrangement with crossed center feed 405. The center feed 405 includes two interlocked, crossed PCB boards with baluns for respective dipole arms. The feed can be of other types as well, with different configuration well known to those skilled in the art.

Take the metallic ring 401 as an example, two pairs of first stubs and second stubs, that is, a pair of first stub 406 and second stub 407, and another pair of first stub 408 and second stub 409. As shown in FIG. 4*c*, the metallic stubs 406 and 407 generate a new current path 410 in combination with a separating point (also referred to as the enclosed vertex or the corner point of the metallic ring) B for induced current, over the high-band. The other pair of metallic stubs 408 and 409 in combination with a separating point C of the monopole arm forms a new current path 411 for the induced current over the high-band. The lengths of the stubs and the positions thereof may be determined in a similar way as for the pair of stubs in FIG. 3, reference may be made to related descriptions for FIG. 3. In an implementation, the current paths 410 and 411 may be set as approximately half-wavelength long of the high band.

Figure 5:
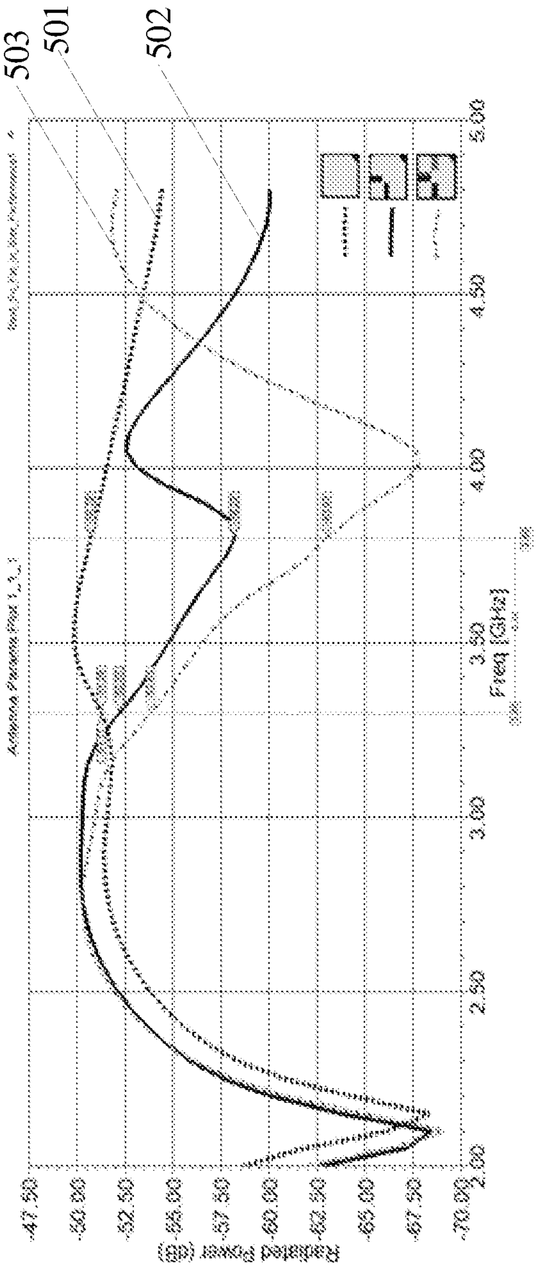
FIG. 5 illustrates a plot of radiated powers of the dual-polarized radiator formed by using the ring from FIG. 2, FIG. 3 and FIG. 4*c*.

Now the performance of the proposed antenna apparatus will be described with reference to FIG. 5. FIG. 5 illustrates a plot of radiated powers of the dual-polarized radiator formed by using the ring from FIG. 2, FIG. 3 and FIG. 4*c*. The results are shown here to illustrate the impact of proposed solution on scattering characteristics of the low-band radiator over the high-band.

Specifically, in FIG. 5, there are three lines which show the simulated radiated power (over frequency) for three cases, where each case represents one form of monopole arm. The lower the radiated power, the less effect it will have on the performance of the high-band radiator. Referring to FIG. 5, the dashed line 501 (the first case where the monopole arm is in its original form) is the radiated power of the metallic ring shown in FIG. 2 relative to the frequency, the solid black line 502 (the second case where the one vertex of the monopole arm has a pair of stubs) is the radiated power of the metallic ring shown in FIG. 3 relative to the frequency, and the dashed line 503 (the third case where the two vertexes of the monopole arm both have one pair of stubs) is the radiated power of the metallic ring shown in FIG. 4*c* relative to the frequency. Attention is drawn to the performance around 4 GHz, it can be seen from the figure that without the using of the stubs (as shown by line 501), the radiated power of the low-band radiator around 4 GHz is relatively high, which would deteriorate the performance of the high-band radiator; with one pair of stubs (as shown by line 502), the radiated power of the low-band radiator at the valley around 4 GHz is decreased, to about −58.22 dB; with two pairs of stubs (as shown by line 503), the radiated power of the low-band radiator at the valley around 4 GHz is decreased even more, to about −67.5 dB.

In fact, the structure shown in FIG. 4*c*, with the low-band dipole arm being formed by two rectangular metallic rings with two pairs of stubs over each ring's vertexes, can reduce the radiated power through it by about −15 dB; consequently the beam shape recovered well along with the cross-polarization characteristics, in both azimuth and elevation planes. The low-band radiators in multi-band antenna may have the operating bandwidth greater than 45% and a horizontal beam width in the range of 55-75 Degrees.

Besides, the valley becomes wider with more stubs arranged. The stubs over the vertexes of rectangular/square metal-ring or the ring in any other shape, such as circular can be applied to make it scattering free over the high-band. If beside these two pairs, other stubs are applied over the periphery of the ring, in combination with the existing stubs, these new stubs may resonate and further widen the scattering free bandwidth.

Figure 6:
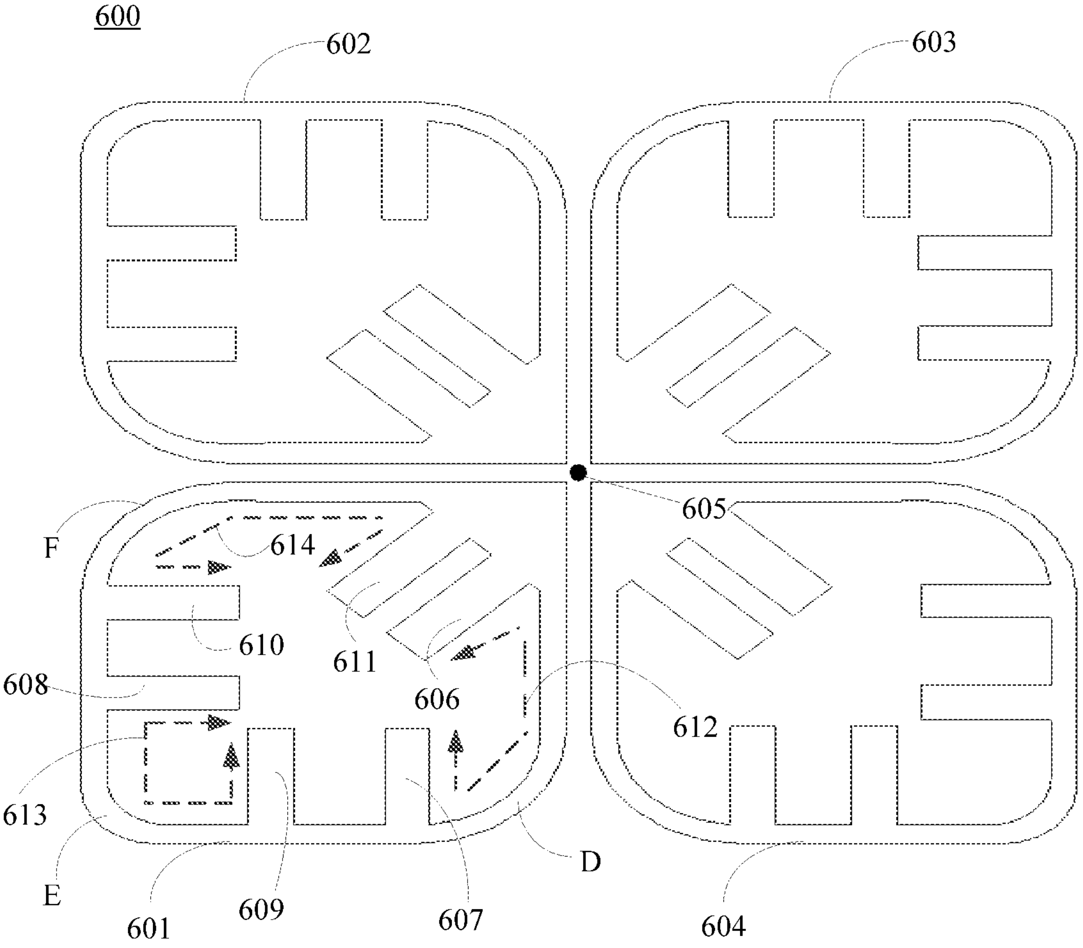
FIG. 6 illustrates a schematic top view of dipole arms of a low-band radiator for dual-polarized dual-band antenna apparatus according to an embodiment of the present application.

As an embodiment, FIG. 6 illustrates a schematic top view of dipole arms of a low-band radiator for dual-polarized dual-band antenna apparatus according to an embodiment of the present application. Comparing with FIG. 4*a*, the difference lies in that in FIG. 6, each monopole arm of the dual-polarized radiator (the low-band radiator) has three pairs of stubs, each pair of stubs applied over the vertex of the monopole arm.

Specifically, the first radiator 600 (the low-band radiator) also contains fours rectangular metallic rings 601-604, with side length of approximately quarter wavelength, form the +45 Deg and −45 Deg polarization dipole arms. Each metallic ring is a monopole arm of the first radiator 600 and includes three pairs of first stubs and second stubs, each pair of the first stubs and the second stubs are arranged on both sides of a separating point of the monopole arm.

In an implementation, the dipole arms are configured in cross-dipole arrangement with crossed center feed 605. The center feed 605 includes two interlocked, crossed PCB boards with baluns for respective dipole arms. The feed can be of other types as well, with different configuration well known to those skilled in the art.

Take the metallic ring 601 as an example, three pairs of first stubs and second stubs, that is, a pair of first stub 606 and second stub 607, and a pair of first stub 608 and second stub 609, and another pair of first stub 610 and second stub 611. The metallic stubs 606 and 607 generate a new current path 612 in combination with a separating point D for induced current, over the high-band, the pair of metallic stubs 608 and 609 in combination with a separating point E of the monopole arm forms a new current path 613 for the induced current over the high-band, and the pair of metallic stubs 610 and 611 in combination with a separating point F of the monopole arm forms a new current path 614 for the induced current over the high-band. The lengths of the stubs and the positions thereof may be determined in a similar way as for the pair of stubs in FIG. 3, reference may be made to related descriptions for FIG. 3. In an implementation, the current paths 612-614 may be set as approximately half-wavelength long of the high band.

With the structure shown in FIG. 6, the scattering free bandwidth may be further widened.

Figure 7:
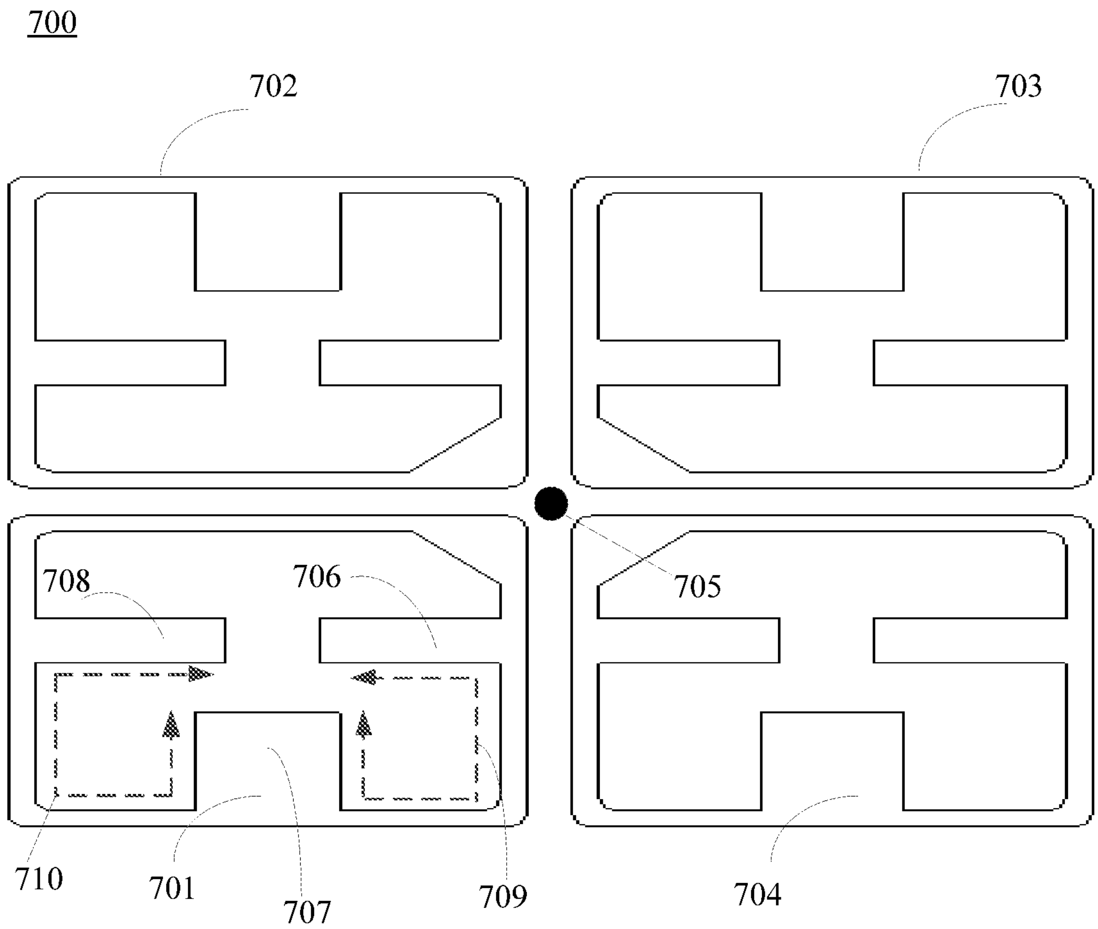
FIG. 7 illustrates a schematic top view of dipole arms of a low-band radiator for dual-polarized dual-band antenna apparatus according to an embodiment of the present application.

FIG. 7 illustrates a schematic top view of dipole arms of a low-band radiator for dual-polarized dual-band antenna apparatus according to an embodiment of the present application.

Specifically, the first radiator 700 (the low-band radiator) also contains fours rectangular metallic rings 701-704, with side length of approximately quarter wavelength, form the +45 Deg and −45 Deg polarization dipole arms. Each metallic ring is a monopole arm of the first radiator 700 and is of the same structure.

In an implementation, the dipole arms are configured in cross-dipole arrangement with crossed center feed 705. The center feed 705 includes two interlocked, crossed PCB boards with baluns for respective dipole arms. The feed can be of other types as well, with different configuration well known to those skilled in the art.

Take the metallic ring 701 as an example, it includes one first stub 706, one second stub 707, and one third stub 708, the second stub 707 is arranged between the first stub 706 and the third stub 708. One end of the third stub 708 is connected to a third connecting point (which is for connecting the third stub 708 to the first radiator and is not shown in the figure) on the first radiator, the other end of the third stub 708 is a free end. Where a sum of a length of the first stub 706, a length of the second stub 707, and a length of the first radiator between the first connecting point (which is for connecting the first stub 706 to the first radiator and is not shown in the figure, reference may be made to the first connecting point 3011 shown in FIG. 3) and the second connecting point (which is for connecting the second stub 707 to the first radiator and is not shown in the figure, reference may be made to the second connecting point 3021 shown in FIG. 3) is determined according to a wavelength corresponding to a predefined high frequency, and a sum of a length of the second stub 707, a length of the third stub 708, and a length of the first radiator 700 between the second connecting point and the third connecting point is determined according to the wavelength corresponding to the predefined high frequency. The lengths of the first and second stubs in FIG. 7 and the positions thereof may be determined in a similar way as the first stub 301 and the second stub 302 in FIG. 3, also, the length of the third stub 708 and the position thereof may be determined in a similar way as the first stub 301 and the second stub 302 in FIG. 3, and said sum may also be determined in a similar way as for FIG. 3, reference may be made to related descriptions for FIG. 3. Hence, similar to FIG. 3, in an implementation, the length of the first stub may be chosen to be equal to the length of the second stub. In an implementation, the length of the second stub may be chosen to be equal to the length of the third stub. It should be noted that these stubs may have different lengths as long as the limitation on the sum is satisfied.

FIG. 7 actually illustrates another possible form of the lower-band radiator's dipole arm, where each monopole ring have three stubs only, so as to form two current paths 709 and 710. In this particular case, the second stub 707 lying in the center has been share by both current loops. In fact, comparing with the structure shown in FIG. 4*a*, the second stub 707 shared by the two current loops is actually a merging of the second stub 407 and the second stub 409 in FIG. 4*c*. The performances of these two structures are approximately the same.

Figure 8:
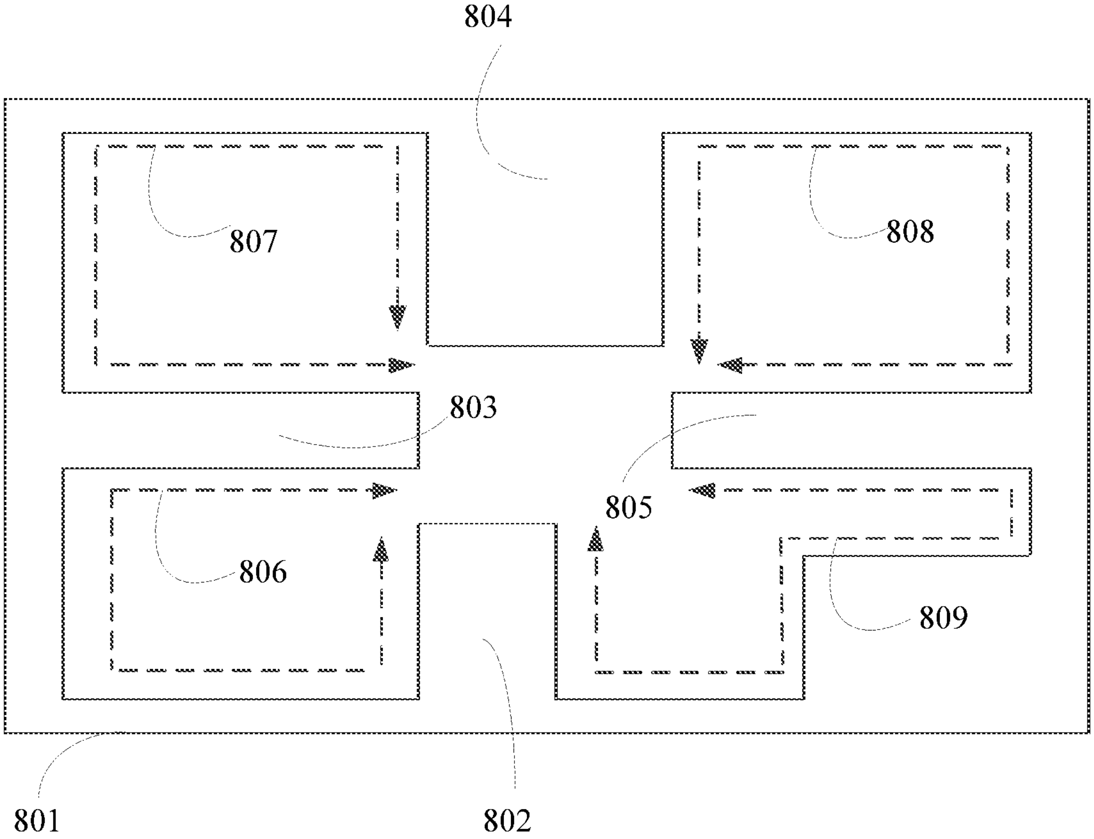
FIG. 8 illustrates a schematic top view of a monopole arm of a dipole arm of a low-band radiator for dual-polarized dual-band antenna apparatus according to an embodiment of the present application.

FIG. 8 illustrates a schematic top view of a monopole arm of a dipole arm of a low-band radiator for dual-polarized dual-band antenna apparatus according to an embodiment of the present application. FIG. 8 in fact shows another possible embodiment where a new stub is added, to generate a new current path, and consequently to widen the radiation free frequency band of the dipole arm of the low-band radiator.

Comparing with FIG. 7, in FIG. 8 which only shows one monopole arm of the dipole arm, one more stub is added in the periphery of the monopole arm. Specifically, as shown in FIG. 8, the monopole arm 801 includes one first stub 802, one second stub 803, one third stub 804, and one fourth stub 805, the fourth stub 805 is arranged between the first stub 802 and the third stub 804. One end of the fourth stub 805 is connected to a fourth connecting point (which is for connecting the fourth stub 805 to the first radiator and is not shown in the figure) on the first radiator, the other end of the fourth stub 805 is a free end. Since in FIG. 8, four current paths 806-809, therefore, similar to the previous embodiments, in addition to the requirements on the current path 806 formed by the first stub 802 and the second stub 803 (similar to the current path 709) and the current path 807 formed by the second stub 803 and the third stub 804 (similar to the current path 710), a new current path 808 is formed by the third stub 804 and the fourth stub 805, and still another new current path 809 is formed by the fourth stub 805 and the first stub 802, hence, a similar limitation is required with regard to the sum of a length of the third stub 804, a length of the fourth stub 805, and a length of the first radiator between the third connecting point (which is for connecting the third stub 804 to the first radiator and is not shown in the figure) and the fourth connecting point, which may be determined according to the wavelength corresponding to the predefined high frequency, as well as a sum of a length of the fourth stub 805, a length of the first stub 802, and a length of the first radiator between the fourth connecting point (which is for connecting the fourth stub 805 to the first radiator and is not shown in the figure) and the first connecting point, which may be determined according to the wavelength corresponding to the predefined high frequency. The length of the fourth stub 805 and the position thereof may be determined in a similar way as the stubs in FIG. 3, and said sum may also be determined in a similar way as for FIG. 3, reference may be made to related descriptions for FIG. 3. Hence, similarly, in an implementation, the length of the third stub may be chosen to be equal to the length of the fourth stub. In an implementation, the length of the second stub may be chosen to be equal to the length of the third stub.

The embodiment shown in FIG. 8 may be of particular advantages in the case where the high band is relatively wider, for example, 1695-2690 MHz. By sharing the aperture of stubs 803 and 805, the presence of the new stub (the fourth stub 805) creates two additional current paths which will resonate in the operating frequency band of the high-band radiator, and thus achieving a wider radiation free band.

Figure 9:
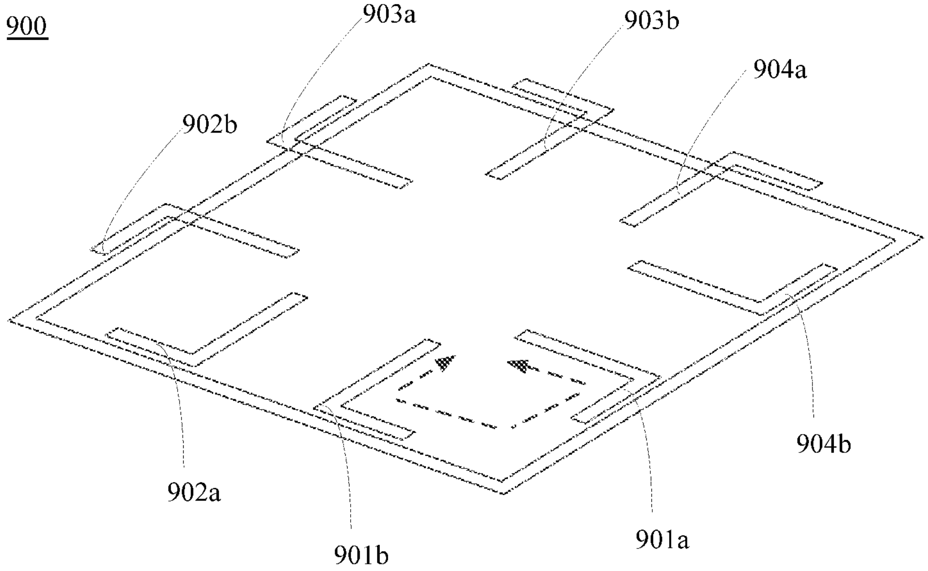
FIG. 9 illustrates a stereogram of a monopole arm of a low-band radiator for dual-polarized dual-band antenna apparatus according to an embodiment of the present application.

FIG. 9 illustrates a stereogram of a monopole arm of a low-band radiator for dual-polarized dual-band antenna apparatus according to an embodiment of the present application. It shows a monopole arm of a low-band radiator with four pairs of L-shape stubs. Comparing with previous embodiments, for example, FIG. 8, the stubs in FIG. 9 are not physically connected to the monopole arm of the low-band radiator, instead, they are coupled thereto, optionally, at almost the same location as the stubs which are physically connected to the monopole arm, around the vertexes. These coupled stubs are of L-Shapes, with the length of the section that is parallel to the monopole arm being smaller than the section that is perpendicular to the monopole arm.

Specifically, as shown in FIG. 9, the monopole arm 900 is provided with four pairs of stubs, including a pair of stubs 901*a* and 901*b*, a pair of stubs 902*a* and 902*b*, a pair of stubs 903*a* and 903*b*, and a pair of stubs 904*a* and 904*b*, with each pair of stubs arranged on both sides of a separating point of the monopole arm. Each pair of stubs may form a new current path shown as the dashed line in the figure, here only the current path formed by the pair of stubs 901*a* and 901*b* is shown as an example. Here, although the manner in which these stubs are incorporated in the radiating arms is different than those applied in previous embodiments of the present application, however, the working principle of these capacitively coupled stubs is the same, that is, the same limitation on the sum of the lengths of the stubs may be required to make it radiation free in the operating frequency band of the high-band radiator. The lengths of stubs and the positions thereof may be determined in a similar way as the stubs in FIG. 3, details are not described herein again for the sake of brevity.

The embodiments of the present application re-direct the induced current over the high-band on the low-band radiator by introducing the stubs across a separating point (also referred to as a vertex) of the dipole ring. These stubs alter the current path then the resonance mode of the induced current over the low-band radiator in the high-band. Thus, the use of one or more stubs, over vertex, is advantageous to reduce the scattering of low-band radiators in high-band. Here in the present application, the applied stubs are creating new current path/paths therefore altering the resonance mode of the induced current on low band radiator arms, over high-band.

The present application also provides a base station including above-described antenna apparatus and a reflector, both of the first radiator and the second radiator are fed through the reflector.

It should be noted that there is no requirement on the connecting manner between the stubs and the first radiator. The terms “connecting point”, “connected to” and “connection” are not intended to limit the connecting manner to be physically connections, instead, it refers to an electronic connection between two elements, the connection may be implemented in many forms, such as direct physical connections or indirect couplings.

Terms such as “first”, “second” and the like in the specification and claims of the present application as well as in the above drawings are intended to distinguish different objects, but not intended to define a particular order.

The term such as “and/or” in the embodiments of the present application is merely used to describe an association between associated objects, which indicates that there may be three relationships, for example, A and/or B may indicate presence of A only, of both A and B, and of B only.

The term “a” or “an” is not intended to specify one or a single element, instead, it may be used to represent a plurality of elements where appropriate.

In the embodiments of the present application, expressions such as “exemplary” or “for example” are used to indicate illustration of an example or an instance. In the embodiments of the present application, any embodiment or design scheme described as “exemplary” or “for example” should not be interpreted as preferred or advantageous over other embodiments or design schemes. In particular, the use of “exemplary” or “for example” is aimed at presenting related concepts in a specific manner.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this application. A computer program product may include a computer-readable medium.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that he may still make modifications to the technical solutions described in the foregoing embodiments, or make equivalent replacements to some technical features thereof, without departing from the spirit and scope of the technical solutions of the embodiments of the present invention.

What is claimed is:

1. An antenna comprising:

a first radiator configured to radiate a low-frequency signal and a second radiator configured to radiate a high-frequency signal, the first radiator comprising at least one first stub and at least one second stub;

one end of the first stub extends from a first connecting point on the first radiator, the other end of the first stub is a free end;

one end of the second stub extends from a second connecting point on the first radiator, the other end of the second stub is a free end; and a sum of a length of the first stub, a length of the second stub, and a length of the first radiator between the first connecting point and the second connecting point is based on a wavelength corresponding to a predefined high frequency, wherein the sum is set as ½ or ¾ of the wavelength corresponding to the predefined high frequency.

2. The antenna of claim 1, wherein a total number of the first stubs and the second stubs are based on a width of a predefined operating band corresponding to the predefined high frequency.

3. The antenna of claim 1, wherein the length of the first stub is equal to the length of the second stub.

4. The antenna of claim 1, wherein the predefined high frequency corresponding to an operating frequency of the second radiator.

5. An antenna comprising:

a first radiator configured to radiate a low-frequency signal and a second radiator configured to radiate a high-frequency signal, the first radiator comprising at least one first stub and at least one second stub;

one end of the first stub extends from a first connecting point on the first radiator, the other end of the first stub is a free end;

one end of the second stub extends from a second connecting point on the first radiator, the other end of the second stub is a free end; and a sum of a length of the first stub, a length of the second stub, and a length of the first radiator between the first connecting point and the second connecting point is based on a wavelength corresponding to a predefined high frequency, wherein the sum is set as ½ or ¾ of the wavelength corresponding to the predefined high frequency and wherein the first radiator comprises at least one dipole arm, each of the at least one dipole arm comprises two monopole arms, and the at least one first stub and the at least one second stub are connected to the at least one dipole arm.

6. The antenna of claim 5, wherein each of the two monopole arms comprises one first stub and one second stub arranged on both sides of a separating point of the monopole arm.

7. The antenna of claim 5, wherein each of the two monopole arms comprises two pairs of first stubs and second stubs, each pair of the first stubs and the second stubs is arranged on both sides of a separating point of the monopole arm.

8. The antenna of claim 5, wherein each of the two monopole arms comprises three pairs of first stubs and second stubs, each pair of the first stubs and the second stubs is arranged on both sides of a separating point of the monopole arm.

9. The antenna of claim 5, wherein each of the two monopole arms comprises four pairs of first stubs and second stubs, each pair of the first stubs and the second stubs is arranged on both sides of a separating point of the monopole arm.

10. The antenna of claim 5, wherein each of the two monopole arms comprises one first stub, one second stub, and a third stub, the second stub is arranged between the first stub and the third stub;

one end of the third stub is connected to a third connecting point on the first radiator, the other end of the third stub is a free end; and a sum of a length of the second stub, a length of the third stub, and a length of the first radiator between the second connecting point and the third connecting point is determined according to the wavelength corresponding to the predefined high frequency.

11. The antenna of claim 10, wherein each of the two monopole arms further comprises one fourth stub, the fourth stub is arranged between the first stub and the third stub;

one end of the fourth stub is connected to a fourth connecting point on the first radiator, the other end of the fourth stub is a free end;

a sum of a length of the third stub, a length of the fourth stub, and a length of the first radiator between the third connecting point and the fourth connecting point is determined according to the wavelength corresponding to the predefined high frequency; and a sum of the length of the fourth stub, the length of the first stub, and a length of the first radiator between the fourth connecting point and the first connecting point is determined according to the wavelength corresponding to the predefined high frequency.

12. The antenna of claim 11, wherein the length of the first stub is equal to the length of the fourth stub.

13. The antenna of claim 10, wherein the length of the first stub is equal to the length of the second stub.

14. The antenna of claim 10, wherein the length of the second stub is equal to the length of the third stub.

15. The antenna of claim 5, wherein the at least one first stub and the at least one second stub are coupled to the at least one dipole arm.

16. The antenna of claim 5, wherein the first radiator is a dual-polarized radiator comprising two dipole arms.

17. The antenna of claim 5, wherein the second radiator is arranged beneath the first radiator.

18. The antenna of claim 17, wherein the monopole arm is a metallic ring, and wherein the first stub and the second stub are arranged in an inner periphery of the metallic ring.

19. The antenna of claim 5, wherein the predefined high frequency corresponding to an operating frequency of the second radiator.

20. An antenna comprising:

a first radiator configured to radiate a low-frequency signal and a second radiator configured to radiate a high-frequency signal, the first radiator comprising a ring with four sides, at least one first stub and at least one second stub;

one end of the first stub extends from a first connecting point on a first side of the ring and the other end of the first stub is a free end;

one end of the second stub extends from a second connecting point on a second side of the ring different from the first side, the other end of the second stub is a free end; and a sum of a length of the first stub, a length of the second stub, and a length of the first radiator between the first connecting point and the second connecting point is based on a wavelength corresponding to a predefined high frequency, wherein the sum is set as ½ or ¾ of the wavelength corresponding to the predefined high frequency.

* * * * *